United States Patent Office 3,424,781
Patented Jan. 28, 1969

3,424,781
PRODUCTION OF UNSATURATED
ALIPHATIC NITRILES
Clifford William Capp, Ewell, and David James Hadley, Epsom Downs, England, assignors to The Distillers Company Limited, Edinburgh, Scotland, a British company
No Drawing. Filed Dec. 16, 1965, Ser. No. 514,384
Claims priority, application Great Britain, Jan. 1, 1965, 166/65
U.S. Cl. 260—465.3     10 Claims
Int. Cl. C07c *121/02, 121/32*

ABSTRACT OF THE DISCLOSURE

Process for preparing acrylonitrile by reacting propylene in the vapour phase in the presence of oxygen and ammonia over an oxide composition containing antimony, chromium and vanadium which has been heated before use at a temperature in the range of 750° to 950° C.

---

The present invention relates to the production of unsaturated aliphatic nitriles and in particular to the production of acrylonitrile.

Accordingly the present invention is a process for the production of acrylonitrile which comprises reacting at an elevated temperature in the vapour phase propylene, molecular oxygen and ammonia over an oxide composition containing antimony, chromium and vanadium which has been heated before use at a temperature in the range 750° to 950° C. in a molecular oxygen containing gas as catalyst.

The oxide composition catalyst of the present invention may be regarded as a mixture of antimony, chromium and vanadium oxides, or as an oxygen-containing compound of antimony, chromium and vanadium; under the reaction conditions the catalyst may contain either or both forms.

The oxide composition catalyst may be prepared, for instance, by intimately mixing the oxides or compounds yielding the oxides on decomposition e.g. carbonates or hydrated oxides of antimony and chromium with an oxide or compound of vanadium or by co-hydrolysis of the chlorides by for example the addition of ammonia to their aqueous solution or by oxidation of the metals. The vanadium oxide or compound may be added during or after the admixture of the antimony and chromium oxides or compounds, for instance vanadium may be incorporated by impregnating the two other mixed oxides with a solution of vanadium pentoxide in an organic acid e.g. oxalic acid and decomposing the oxalate by heating. Oxides of antimony which may be used in the manufacture of the catalysts include antimony trioxide, antimony tetroxide, antimony pentoxide or mixtures of these oxides.

The proportions of the various components of the catalyst may vary within moderately wide limits. Usually the composition will contain a molar excess of antimony over any other single component, with an atomic ratio of antimony to vanadium in the range 10 to 1 and of antimony to chromium also in the range 6 to 1.

The catalysts used in the process of the present invention, may, if desired, be deposited on supports such as alumina, silica, or titania.

The reaction of propylene with oxygen and ammonia over the catalysts may be carried out in any suitable manner, for instance as a fixed bed process in which the catalyst is used in the form of granules or pellets, or as a fluidised bed process, or as a moving bed process.

The concentration of propylene in the feed to the reaction may vary within fairly wide limits, for example between 1 and 20% by volume of the feed, and suitably between 2 and 10% by volume. It is preferred to use between 4 and 7% by volume of the propylene in the feed.

The concentration of oxygen in the feed may also vary within moderately wide limits, for example between 1 and 20% by volume and preferably between 2 and 15% by volume. The oxygen may be diluted with inert gases, and may be, for example, supplied as air.

The reaction is suitably carried out in the presence as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of steam may vary within wide limits, for instance, between 10 and 60% by volume of the feed.

The concentration of ammonia may also vary within moderately wide limits, for instance between 2 and 10% by volume of the feed. If the maximum yield of acrylonitrile on propylene is required, it may be desirable to use an excess of ammonia over propylene. The preferred concentration of ammonia is about 5–6% by volume of the feed when this contains 5% of propylene.

The reaction is carried out at an elevated temperature preferably between 300 and 550° C.

The contact time, defined as the volume of catalyst divided by the flow of gas per second calculated at room temperature and pressure, may be, for example in the range 1–30 seconds.

The reaction may be carried out at atmospheric pressure, or at super- or sub-atmospheric pressures. It is preferred to operate at a pressure of 1 to 5 atmospheres absolute.

The acrylonitrile may be recovered from the reaction products in any suitable manner, for example by extraction with water, preferably at an acid pH, followed by fractional distillation. In one method the hot reaction gases are contacted firstly with a cold dilute aqueous solution of sulphuric acid which neutralises excess ammonia and extracts some of the nitrile, and secondly with cold water to extract the remainder of the nitrile, the nitrile is subsequently recovered from the extracts by fractional distillation.

The process of the invention is further illustrated with reference to the following examples.

EXAMPLE 1

A catalyst was prepared as follows: Chromium chloride hexahydrate ($CrCl_3.6H_2O$, 133 parts by weight) was dissolved in water (500 parts) and antimony trioxide (Timonox—registered trademark, 210 parts) added. The mixture was vigorously stirred, and sufficient 880 ammonium hydroxide solution added, at 20° C., dropwise to precipitate chromium hydroxide, and such that the liquid had a pH of 8, and then filtered. Vanadium pentoxide (18.2 parts) was stirred with water (100 parts) at 50° C. and dissolved by the addition of oxalic acid. The mixed antimony-chromium oxides were added to the vanadium oxalate solution and the whole evaporated to dryness. After drying the residue for 12 hrs. at 120° C. it was formed into ⅛ in. diameter tablets which were heated in an air stream initially at 100° C. The temperature was then raised to 900° C. at 22/hr. and maintained at 900° C. for 16 hrs. The catalyst then contained antimony, chromium and vanadium in the atomic ratios Sb:Cr:V=3:1:0.4

A mixture of propylene (1163 parts by volume at N.T.P.) ammonia (1455 parts), air (13,400 parts) and steam (8530 parts) were preheated and passed over the catalyst (23 parts by volume) in an isothermal reactor at 458°. The yield of acrylonitrile was 59% at an efficiency of 65% on propylene.

Example 2

A further series of antimony, chromium, vanadium oxide catalysts was prepared using the method described in Example 1, excepting that the quantities of metal compounds were changed to give the different Sb:Cr:V atomic ratios shown in the table, and in some cases the final heat treatment temperature for 16 hrs. was increased to 950°. The catalysts were tested by the procedure described in Example 1 and the maximum yields of acrylonitrile were determined and are shown below:

| Atomic ratio of metals | | | Heat treatment, temperature (° C.) | Yield of acrylonitrile on propylene fed (percent) |
| --- | --- | --- | --- | --- |
| Sb | Cr | V | | |
| 2 | 1 | 0.4 | 950 | 46 |
| 4 | 1 | 0.4 | 950 | 44 |
| 3 | 0.5 | 0.4 | 950 | 49 |
| 1.9 | 0.4 | 0.4 | 900 | 57 |

We claim:

1. A process for the production of acrylonitrile which comprises reacting at an elevated temperature in the vapour phase, propylene, molecular oxygen and ammonia over an oxide composition consisting essentially of oxygen antimony, chromium and vanadium which has been heated before use at a temperature in the range 750° to 950° C. in a molecular oxygen-containing gas, as catalyst.

2. A process as claimed in claim 1 wherein the atomic ratio of antimony to vanadium in the oxide composition is in the range of from 10 to 1 and the atomic ratio of antimony to chromium is in the range of from 6 to 1.

3. A process as claimed in claim 1 wherein the reaction is carried out employing the oxide composition in the form of a fixed bed.

4. A process as claimed in claim 1 wherein the reaction is carried out employing the oxide composition in the form of a fixed bed or moving bed.

5. A process as claimed in claim 1 wherein the concentration of propylene in the feed to the reaction is between 4 and 7% by volume, the concentration of the oxygen is between 2 and 15% by volume, and the concentration of ammonia is between 2 and 10% by volume.

6. A process as claimed in claim 1 carried out in the presence as diluent, of a gas which is substantially inert under the conditions of reaction.

7. A process as claimed in claim 6 wherein the diluent is selected from the group consisting of nitrogen, propane, butane, isobutane, carbon dioxide or steam or mixtures thereof.

8. A process as claimed in claim 7 wherein the diluent is a mixture of nitrogen and steam.

9. A process as claimed in claim 8, wherein the diluent comprises steam in concentration in the feed between 10 and 60% by volume.

10. A process according to claim 1 wherein the reaction temperature is between 300° and 550° C., the contact time is in the range of 1 to 30 seconds and the reaction is carried out at a pressure of from 1 to 15 atmospheres absolute.

References Cited

UNITED STATES PATENTS

| | | | |
| --- | --- | --- | --- |
| 3,226,421 | 12/1965 | Giordano et al. | 260—465.3 |
| 3,324,166 | 6/1967 | Sennewald et al. | 260—465.3 |
| 3,338,952 | 8/1967 | Callahan et al. | 260—465.3 |
| 3,340,291 | 9/1967 | Barclay et al. | 260—465.3 |

JOSEPH P. BRUST, *Primary Examiner.*

U.S. Cl. X.R.

252—456, 464, 467